United States Patent [19]

Albrecht

[11] Patent Number: 4,957,024
[45] Date of Patent: Sep. 18, 1990

[54] SAW MOUNT FOR USE ON A CONVENTIONAL WORKSHOP TABLE

[76] Inventor: James O. Albrecht, 4701 Aberdeen Rd., Mound, Minn. 55364

[21] Appl. No.: 320,781

[22] Filed: Mar. 9, 1989

Related U.S. Application Data

[63] Continuation of Ser. No. 81,604, Aug. 13, 1987, abandoned, which is a continuation of Ser. No. 766,680, Aug. 19, 1985, abandoned, which is a continuation of Ser. No. 440,450, Nov. 10, 1982, abandoned, which is a continuation-in-part of Ser. No. 177,215, Aug. 11, 1980, abandoned.

[51] Int. Cl.$^5$ .......................... B27B 5/20; B26D 1/18
[52] U.S. Cl. .................................. 83/471.3; 83/486.1; 83/574; 83/767
[58] Field of Search ...................... 83/574, 745, 471.3, 83/486.1, 762, 764, 767, 471.2; 403/109, 377

[56] References Cited

U.S. PATENT DOCUMENTS

| 2,589,554 | 3/1952 | Killian | 83/574 X |
| 2,630,146 | 3/1953 | Van Tuyl | 83/574 |
| 3,011,530 | 12/1961 | Lamb | 83/745 |
| 3,304,967 | 2/1967 | Kujan | 83/486.1 |
| 3,866,496 | 2/1975 | Payne et al. | 83/471.3 |
| 3,945,286 | 3/1976 | Smith | 83/486.1 |

Primary Examiner—Hien H. Phan
Assistant Examiner—Kenneth E. Peterson
Attorney, Agent, or Firm—Warren A. Sturm

[57] ABSTRACT

The saw mount includes a support member having a vertical collar on its horizontal flange which encircles an upstanding tubular post on a flat base plate that can be bolted to a conventional workshop table. Projecting horizontally from the vertical flange of the support member are two tubular rails having inwardly facing horizontal slots. Within the tubular rails are telescopically received additional tubes having a generally U-shaped cross section with strips or flanges secured thereto and projecting outwardly through the slots so that a turntable can be detachably carried by the strips or flanges. Alternatively, the rails may be of solid or closed tubular configuration and the turntable supported by generally complementary configured, horizontally spaced apart support members adapted to be slidably supported on the rails. The turntable has an opening of sufficient width therein so that the work can be viewed through a transparent sheet of plastic overlying said opening. Not only can the support member, together with the tubular rails, be rotated about the upstanding tubular post, and also clamped in a preferred rotative position, but the turntable itself can be rotated into various angled positions so that virtually any type of saw cut can be made.

13 Claims, 7 Drawing Sheets

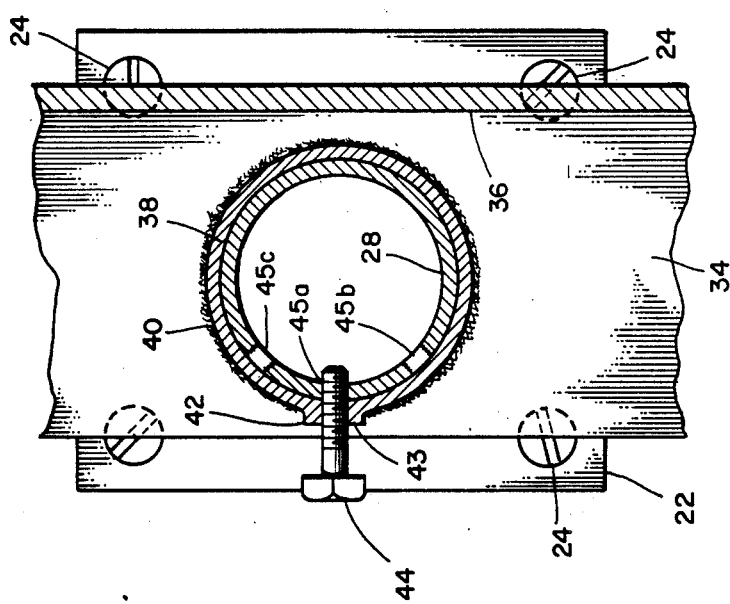
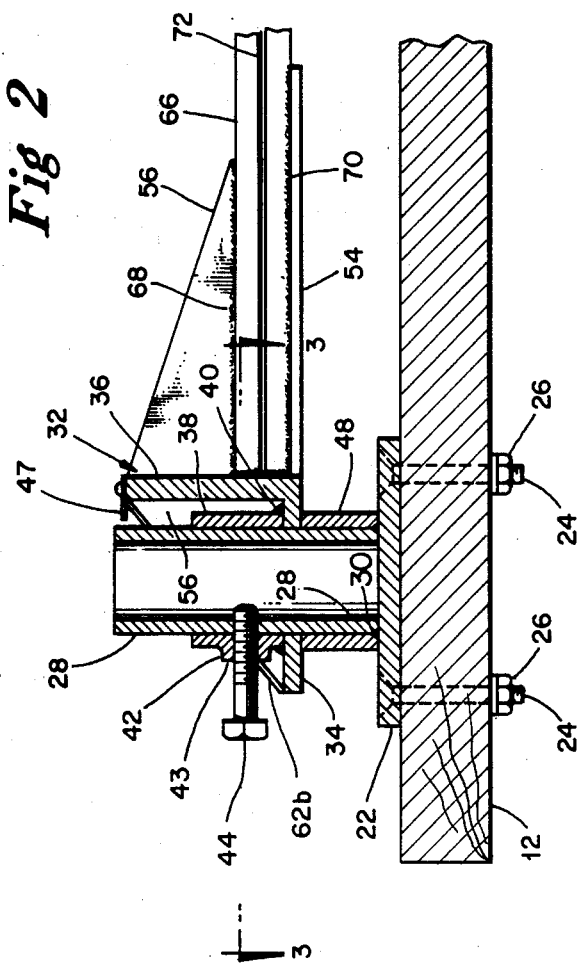
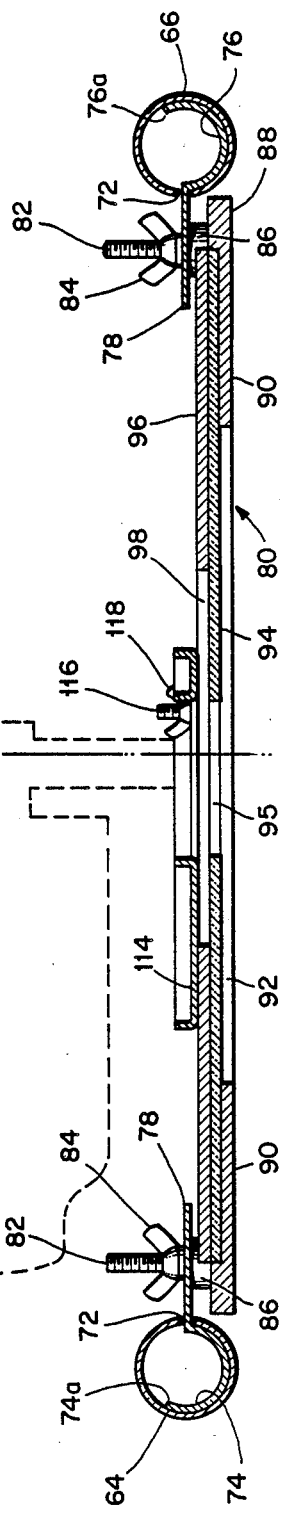
Fig 3
Fig 2
Fig 4

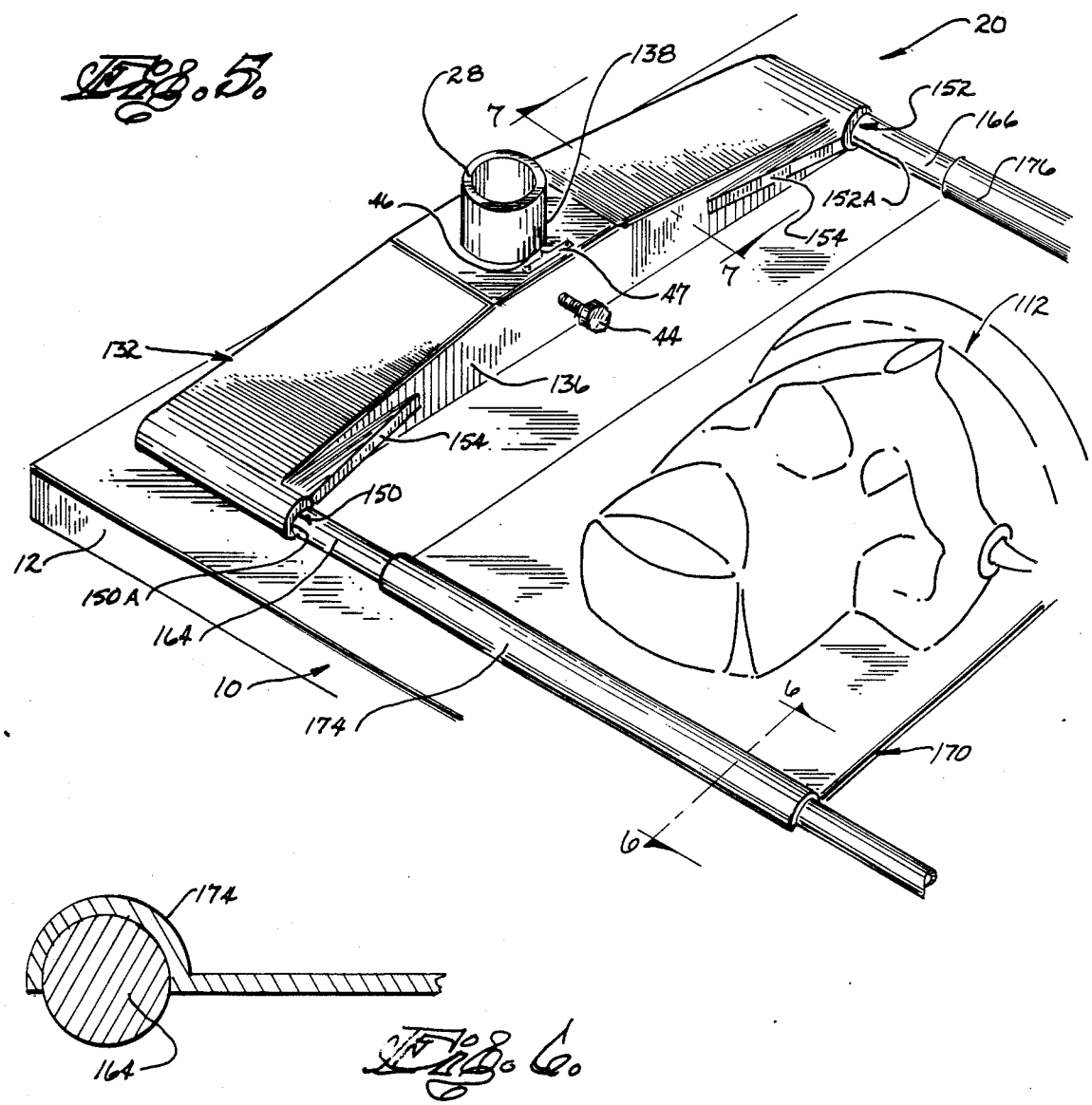
Fig. 5.
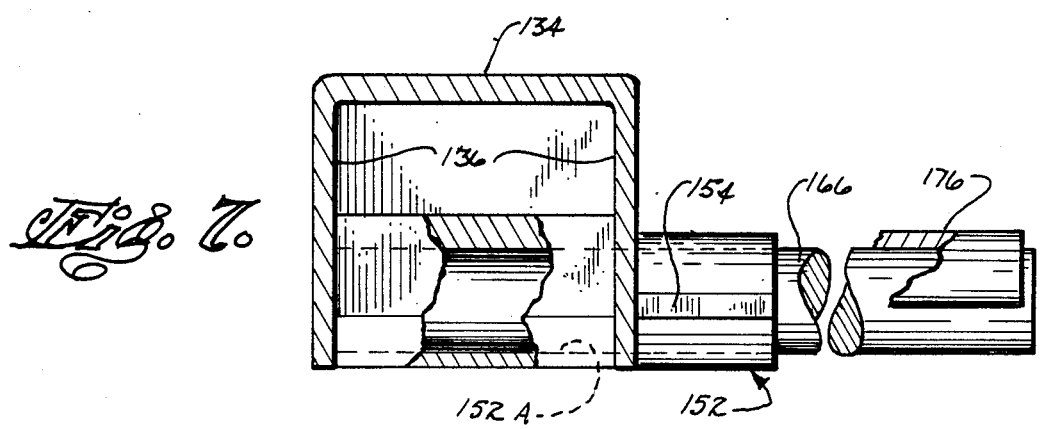
Fig. 6.
Fig. 7.

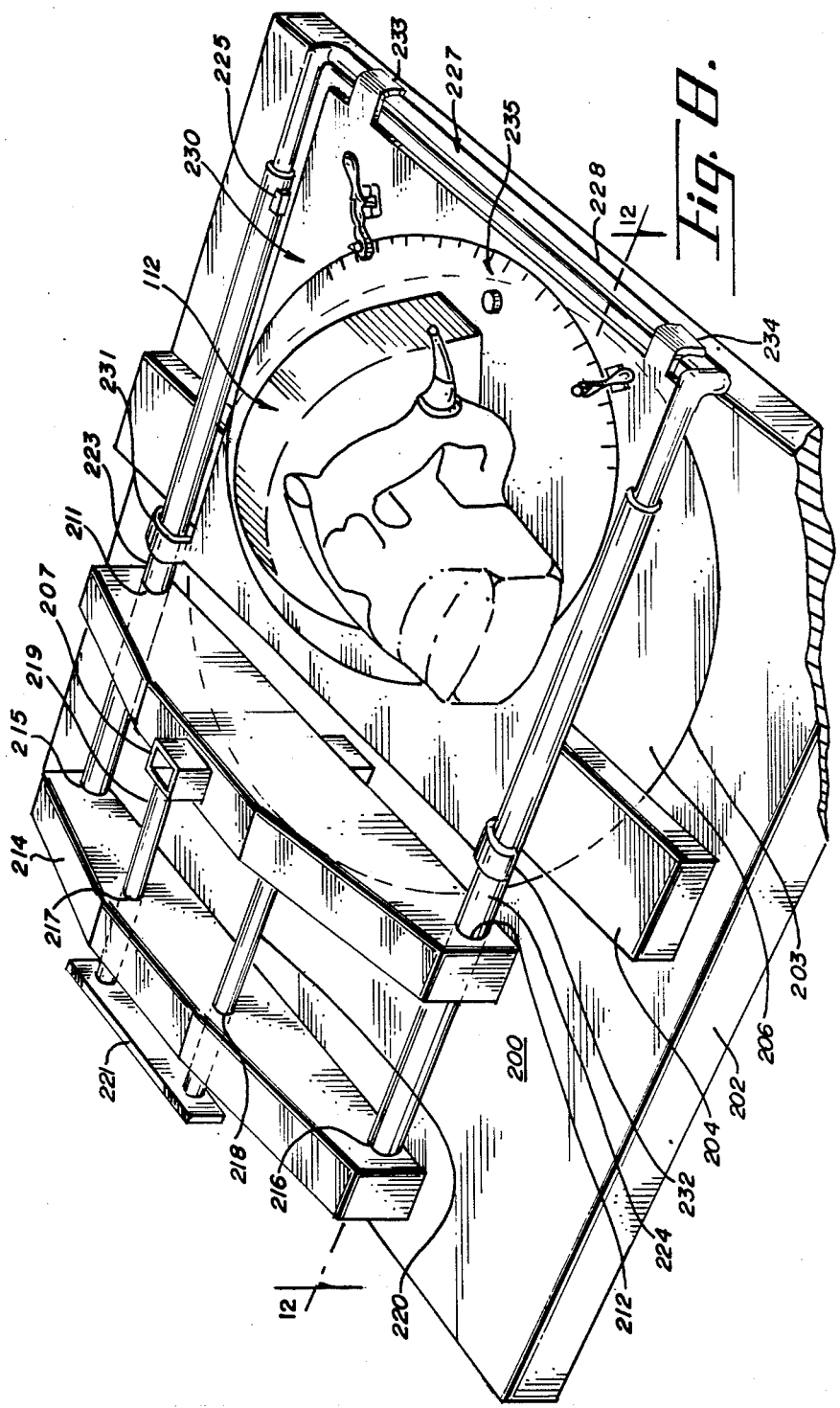

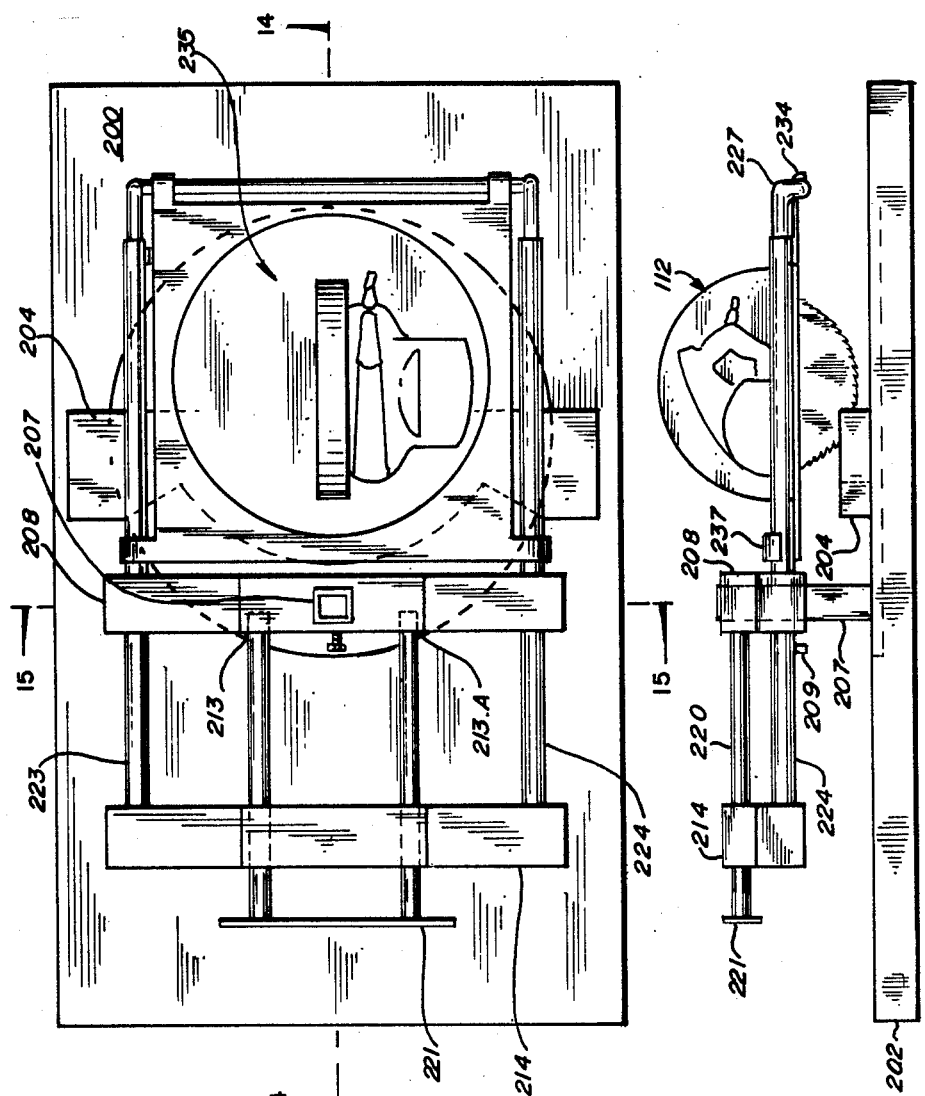

SAW MOUNT FOR USE ON A CONVENTIONAL WORKSHOP TABLE

This is a continuation of co-pending application Ser. No. 07/081,604 filed on 08/03187, now abandoned, which is a continuation of application Ser. No. 06/766,680 or 8/19/85, now abandoned, which is a continuation of application Ser. No. 06/440,450 filed 11/10/82, now abandoned, which is a continuation-in-part of application Ser. No. 177,215, filed Aug. 11, 1980, now abandoned.

BACKGROUND OF THE INVENTION

1. Field of the Invention

This invention relates generally to saw mounts, and pertains more particularly to a saw mount that can be attached to the top of a conventional workshop table.

2. Description of the Prior Art

Various guides or mounts have been devised for supporting conventional circular saws. One such mount, or guide, as it is called, is described in U.S. Pat. No. 2,630,146 issued to Sidney E. Van Tuyl on Mar. 3, 1953 for "GUIDE FOR PORTABLE POWER TOOLS". While the guide permits the user to perform both crosscut and ripping operations, in practice, considerable trouble would be encountered in changing from one operation to the other. Not only is it rather difficult to make the changeover from a crosscut to a ripsaw operation, but the entire guide is made more complicated than it should in order to effect the change from one type of saw cut to the other. Also, unless close tolerances are adhered to, the guide cannot be used for precise cutting and has this as an additional disadvantage.

SUMMARY OF THE INVENTION

The present invention has for an object the capability of making crosscuts and ripcuts with a minimum of difficulty with respect to changing from one type of cut to the other.

Another object is to provide a versatile saw mount that will accurately guide the circular saw mounted thereon so that crosscuts, ripcuts and various angled cuts can be precisely made.

Also, the invention has for an object the provision of a saw mount that can be raised and lowered, as well as oriented into various angled positions. Thus, various thicknesses of work can be cut.

Another object of the invention is to permit the entire mount to be easily attached to a conventional workshop table. In this regard, the invention has for an aim the provision of a lightweight saw mount that is quite rigid, allowing it to be fastened to the tabletop at only one end thereof, the rails or track then extending toward the user in an unsupported manner (other than the end at which it is mounted).

A further object of the invention is to permit the saw mount to be readily disassembled into several basic components, thereby allowing the user to readily transport the saw mount to various locations whenever it is desired to do so.

Still another object is to provide a saw mount that requires little or no maintenance and which is extremely long lasting.

Yet another object of the invention is to provide a saw mount of the foregoing character that can be fabricated at a relatively low cost, thereby encouraging its widespread use.

Briefly, my invention includes an angle support member which can be maintained at various elevations and at various angles with respect to a base plate when the base plate is fastened to a conventional workshop table. The base plate constitutes the sole means of attaching my mount to the table. Extending horizontally from a vertical flange of the angle support member are two parallel tubular rails which accommodate thereon additional tubes having a generally complementary shaped cross section for reciprocatory motion and including strips or flanges integral therewith, the flanges supporting a turntable on which a conventional circular saw is mounted by the user.

BRIEF DESCRIPTION OF THE DRAWINGS

FIG. 2 is a sectional view taken in the direction of line 2—2 of FIG. 1 in order to illustrate how the mount can be swung or swiveled into various angled positions;

FIG. 3 is sectional view taken in the direction of line 3—3 of FIG. 2, and

FIG. 4 is a sectional view taken in the direction of line 4—4 of FIG. 1 for the purpose of showing the turntable constructions and the manner in which the turntable is guided rectilinearly by the tubular tracks;

FIG. 5 is a fragmentary perspective view of a further embodiment of a saw mount embodying the principles of my invention;

FIG. 6 is an enlarged sectional view taken along section line 6—6 on FIG. 5;

FIG. 7 is an enlarged sectional view taken along line 7—7 on FIG. 5;

FIG. 8 is a perspective sketch of another embodiment of my invention;

FIG. 9 is a top plan view of the embodiment of FIG. 8 of the drawings;

FIG. 10 is a side elevational view of the embodiment of FIG. 8.

DESCRIPTION OF THE PREFERRED EMBODIMENT

Figure 1:
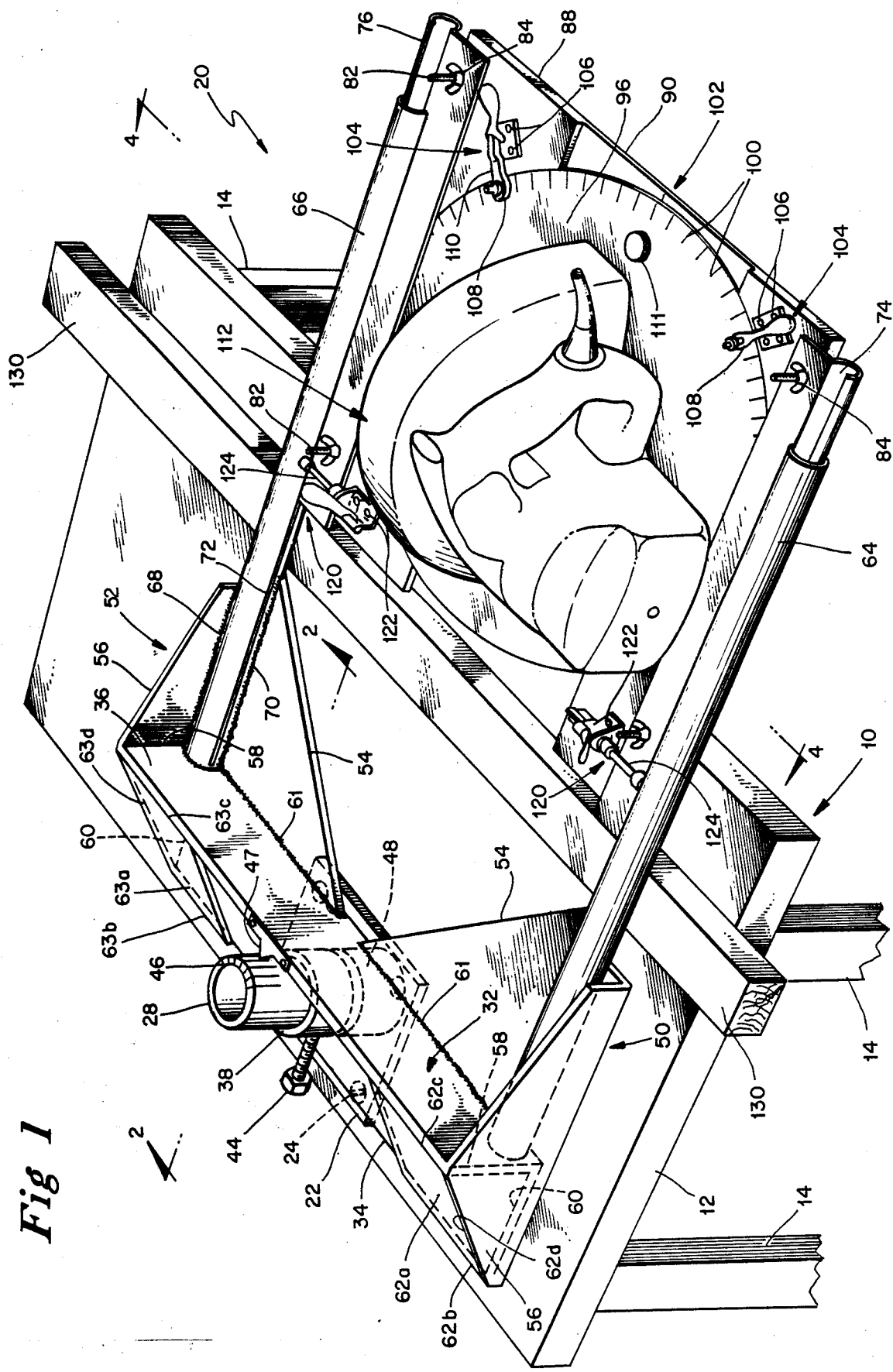
FIG. 1 is a perspective view of a saw mount exemplifying my invention, the view depicting the mount when fastened to a workshop table and having a conventional power driven circular saw attached to its turntable.

Inasmuch as one of the features of my invention is the capability of attaching my saw mount to a conventional workshop table, such a table has been fragmentarily depicted in FIG. 1 and has been assigned generally the reference numeral 10. All that need be explained is that the workshop table 10 includes a tabletop 12 having a sufficient thickness so as to render it fairly rigid; in this regard, the tabletop 12 can be considered to be composed of whatever number of thick planks, preferably two inches thick, that are abutted together to provide a top of sufficient width in a horizontal direction to accommodate various types of work. To complete the description of the workshop table 10, it can be mentioned that it has suitable legs 14.

My saw mount has been designated generally by the reference number 20. As best understood from FIG. 2, the saw mount 20 includes a base plate 22 having four holes therein which are chamfered so as to accommodate flathead bolts 24 which extend downwardly through the tabletop 12, having nuts 26 threadedly engaged thereon so as to firmly anchor the base plate 22 in place. Centrally located on the base plate 22 is an upstanding tubular post 28, the lower end of the post 28 being welded to the base plate 22 at 30.

At this time attention is directed to an angle member 32 having a horizontal flange 34 and a vertical flange 36. The horizontal flange has attached thereto a collar 38 of sufficient diameter so as to freely encircle the upstanding post, the lower end of the collar 38 being welded at 40 to the horizontal flange 34. Inasmuch as the collar 38, in a sense, performs a bearing function, only a small clearance between it and the upstanding post 28 is desired.

The collar 38 has integral therewith a radially projecting boss 42 that is drilled at 43 so as to loosely receive therein a set screw 44. As can be readily understood from FIGS. 2 and 3, the set screw 44 will maintain the collar 38 at any of three preferred angles with respect to the post 28. The three preferred angles are readily obtained by threadedly engaging the set screw 44 with any of the tapped holes 45a, 45b or 45c (FIG. 3). The tapped holes 45a, 45b and 45c provide a right angle relationship, and two 45 degree angles to either side. In oder to indicate to the user what angle the collar 38 is with respect to the post 28, the upper end of the post 28 is embossed with angled markings 46 that coact or cooperate with the pointer 47 extending horizontally from the upper edge of the vertical flange 36. A bushing or sleeve 48 supports the angle member 32 at a preferred elevation determined by the length thereof; bushings of other lengths can be easily substituted therefor.

Two brackets or brace units 50 and 52 are welded to the angle member 32. In this regard, it will be observed that each bracket or brace 50, 52 has a horizontal flange or gusset 54 and a vertical flange or gusset 56. In order to make the saw mount 20 as rigid as possible for the amount of material incorporated therein, it is desirable to weld the vertical flanges or gussets 56 to the ends of the angle member 32, welds located generally at 58 and 60 being used. It is also recommended that additional welds at 61 be employed, these welds 61 being applied along the juncture of the flanges 36 and 54. To permit the angle member 32 to be of relatively thin gauge, metal plates 62a and 63a are welded along their edges 62b and 63b to the horizontal flange 34 of the angle member 32, along their edges 62c and 63c to the vertical flange 36 of the member 32, and along their edges 62d and 63d to the vertical gussets 56.

Projecting horizontally from the vertical flange 36 of the angle member 32 are two tubular rails 64 and 66. The ends of the rails 64, 66 abut against the vertical flange 36 and a substantial longitudinal portion of the tubular rails 64, 66 overlie the upper face of the horizontal flange or gusset 54. As can be readily appreciated from FIGS. 1 and 2, the tubular rail 66 is welded at 68 to the vertical flange or gusset 56 of the bracket 52 and also at 70 to the horizontal flange or gusset 54 of the bracket 52. The rail 64 is similarly welded to the flanges or gussets 54, 56 of the bracket 50.

It is important to appreciate that the sole support for the entire saw mount 20 is derived from the base plate 22 and thus in order to maintain the rails 64, 66 horizontally, more specifically in a cantilevered fashion, the welding of the tubular rails 64, 66 to the brackets or brace units 50, 52 as just described is quite important. It should also be noted that each tubular rail 64, 66 has a longitudinal slot 72 formed therein, the slots 72 of the two rails 64, 66 facing toward each other.

Telescopically slidable within the tubular rails 64, 66 are additional tubular members 74, 76, having a U-shaped cross section (actually slightly more than a semicircle, as can be seen in FIG. 4), each tubular member 74, 76 having an inwardly directed strip or flange 78 integral therewith and each flange 78 projecting through the above-mentioned slots 72 in the tubular rails 64, 66. The members 74, 76 and their flanges 78 can be of metal; however, thermoplastic material, such as vinyl or nylon, provides excellent sliding capabilities and can be readily formed by cutting a strip from a plastic sheet and then thermally deforming such a strip to form the member 74 and its flange 78, as well as the member 76 and its flange 78. In any event, the members 74, 76 are sufficiently resilient so that the free edge 74a of the member 74 and the free edge 76a of the member 76 flex outwardly to pressurally engage the insides of the rails 64 and 66, respectively.

From FIG. 4, it can be seen that the inwardly directed strips or flanges 78 support or carry a turntable assembly denoted generally by the reference numeral 80. In this regard, each flange 78 has two longitudinally spaced holes therein and threaded studs 82 extend upwardly through these holes, there being one stud 82 for each hole. The upper threaded portions of the studs 82 have thereon a wing nut labeled 84. Immediately beneath the flanges 78 are tubular spacers 86 that encircle the lower end portions of the studs 82.

The lower extremities of the studs 82 are welded to the marginal portions of a flat plate 88. Stated somewhat differently, the plate 88 is suspended from the inwardly directed flanges 78 that are integral with the generally tubular members 74, 76 that are slidable within the tubular rails 64, 66. The plate 88 is formed with a bridging web 90. The plate 88 has a circular opening 92 therein. A circular plate or disc 94 of clear plastic, such as acrylic, is of a size so as to have its peripheral or marginal portion overlie the web 90, the web 90 in this way providing a bearing or support for the disc 94. The disc 94 has a central elongated opening or slot 95. Still another circular plate or disc 96, this one being of metal, overlies and is secured to the disc 94, the last-mentioned plate 96 having a rectangular opening 98 therein of larger size than the opening 95. In this way the marginal portions of the transparent disc 94 adjacent its opening 95 enable the work to be viewed as will presently be better understood.

The upper disc 96, as is evident in FIG. 1, has embossed thereon a number of gauge markings labeled 100 which rotatably coact with a line or pointer 102, the line or pointer 102 beimg embossed in the web 90 of the underlying plate 88.

Two conventional overcenter clamping devices 104 are fastened to the lower plate 88, such as by small screws 106, at suitable locations so that the free ends or foot portions 108 of their clamping arms 110 will bear against the peripheral margin of the circular plate or disc 96. In this way, the disc 96 can be clamped and held in whatever angled position it has been rotated. A headed pin 111 can also be used to hold the disc 96 in the position shown, the pin extending downwardly through a hole (not visible) in the web 90 of the plate 88. Additional holes (also not visible) will assure that the disc 96 is retained in rotated positions of 90 degrees to either side of the position in which the disc 96 appears in FIG. 1. Of course, the overcenter clamping devices 104 can perform this retention function; the pin 111 permits this to be done more accurately and positively for the specific angular positions that have been mentioned.

Although conventional, a normally hand-held power-driven circular saw has been indicated generally by the reference numeral 112, appearing in solid outline in FIG. 1 and in phantom outline in FIG. 4. It will be appreciated that the base plate 114 of the saw 112 is secured to the upper plate or disc 96 so as to be rotatable with both of the disc 94, 96 when an angled cut is to be made. A pair of studs or screws 116, one of which appears in FIG. 4, extend upwardly through the two discs 94, 96, thereby securing the discs 94, 96 together for rotation in unison. The studs 116 also extend upwardly through holes in the base plate 114 and wing nuts 118 clamp the base plate 114 against the disc 96. Further, it is to be noted that the base plate is secured to the disc 96 so as to leave part of the opening 98 in the disc 96 unobstructed. In this way, the transparent disc 94 provides a "window" for viewing the cutting operation, as previously alluded to.

Two additional overcenter clamping devices 120 are also fastened to the lower plate 88, such as by small screws 122, of suitable locations so that the free ends of reciprocal rods 124 bear against the tubular rails 64, 66. In this way the turntable assembly 80 is retained in whatever rectilinear position in which it has been placed so that it does not move relative to the rails 64, 66.

Referring to the embodiment of FIGS. 5, 6 and 7 of the drawings, wherein like reference characters have been applied to like elements with respect to the illustrated embodiment of FIGS. 1-4, inclusive, my saw mount is indicated generally by reference character 20 and includes a base plate (not shown) attached to the bottom of an upstanding column or tubular post 28 and base plate 22 is similarly mounted on table top 12 of a workshop table 10.

An angle member 132 is shown have a horizontal flange 134 and spaced apart vertical flanges 136 depending downwardly from horizontal flange 134. Angle member 132 is further provided with horizontally spaced apart brackets or brace units 150 and 152 shown extending forwardly from vertical flange 136 and disposed in holes 150a and 152a, respectively, extending into a tube receiving and holding receptacle formed intermediate vertical flange members 136 and are further provided with horizontal flange or gussets 154 to improve the rigidity of angle member 132 for receiving and holding horizontally spaced apart parallel tubes or rails 164 and 166, respectively.

A conventional normally hand-held power-driven circular saw indicated generally by reference character 112 is shown operably disposed on and extending through a horizontally disposed base plate 170 and may be attached thereon by similar mechanism as is illustrated in FIG. 1 of the drawings. Base plate 170 may conveniently be formed to include a pair of horizontally spaced apart parallely oriented portions 174 and 176 that are configured and disposed for rectilinear sliding motion on rails 164 and 166 respectively.

Referring specifically to FIGS. 6 and 7, it is noted that portion 174 does not completely encircle rail 164, as is further illustrated on the right hand side of FIG. 7. While this illustrated embodiment shows a specific configuration for portions 174 and 176 of base plate 170, other configurations may occur to those skilled in the art upon becoming familiar with the principles and characteristics of my invention. It may be noted, however, that in the configuration illustrated in FIG. 6, for example, base plate 170 may conveniently be lifted off of the top of rails 164 and 166, while still maintaining the desired accuracy of operation.

Referring to FIGS. 8–16 of the drawings, a further illustrative embodiment of my saw mount is indicated generally by reference character 200.

Saw mount 200 includes a base 202 which is provided with a circular recess 203 and a fence 204 extending thereacross and attached to base 202 at either end through appropriate fastening means (not shown). A turntable 205 is rotatably shown disposed in circuit recess 203 and retained therein by fence 204 for rotation with respect to base 202 so as to reposition upwardly extending column 207 (which is shown stationarily attached to the top end of turntable 206 and which is provided with a non-circular cross sectional configuration).

A main support frame member 208 is shown mounted for vertical slidable disposition on column 207 and may be retained at a given vertical disposition with respect to the surface of base 202 through the use of setscrew 209.

Support frame member 208 is provided with a non-circular vertical hole 210 that is adapted to receive column 207, as just described, and first a pair of laterally disposed horizontally extending holes 211 and 212 adjacent the outer ends and the bottom surface thereof and a second pair of laterally disposed horizontally extending holes 213 and 213a intermediate vertical hole 210 and horizontal holes 211 and 212.

A subframe 214, having a configuration similar to that of main support frame 208 is shown provided with similarly disposed horizontal holes 215 and 216 adjacent the lower end extremities and 217 and 218 intermediate the ends and the center thereof.

A stop member 221, for limiting the horizontal movement of subframe 214, is shown stationarily disposed over the ends of stops tubes 219 and 220 extending through horizontal holes 217 and 218 in subframe 214 and stationarily attached to and disposed in horizontal holes 213 and 213A in main support frame member 208.

A pair of tubular rails 223 and 224 are shown journaled for reciprocal motion in holes 211 nd 212 in main support frame 208 and stationarily disposed and mounting in holes 215 and 216 in subframe 214, respectively. The other ends of rails 223 and 224 are provided with stops 225 and 226 respectively. Rails 223 and 224 may be slidably and reciprocally journal the ends of tubular U-shaped sliding support frame member 227 having an end 228 extending downwardly and intermediate the side portions slidably disposed in rails 223 and 224.

A saw mounting frame 230 is provided with a pair of laterally extending sliding support ears 231 and 232 and a pair of longitudinally extending support ears 233 and 234. Saw mounting frame 230 is constructed so that laterally extending support ears 231 and 232 are horizontally slidably diposable on the right ends of tubular rails 223 and 224 respectively. The outer end of saw mounting frame 230 is provided with longitudinally outwardly extending support ears 233 and 234 that are stationarily disposed on end 228 of U-shaped sliding support frame member 227 and may be attached thereto by the use of suitable adhesives, welding (not shown) or the like.

A saw mount turntable (similar to that described above in connection with the embodiment of FIGS. 1–4 is shown rotatably disposed on saw frame 230 for receiving and engaging a circular saw, indicated generally by reference character 112.

Turntable 235 is shown provided with a plurality of scale graduations to indicate the relative position of the turntable. Not shown, but similarly, appropriate graduations and a scale may be disposed on turntable 205 and base 202 adjacent recess 293 for the convenience of the operator.

Although the manner in which my saw mount 20 is used should be readily apparent from the preceding description, it perhaps will be well to present a brief operational description in order that the reader will fully appreciate all of the advantages to be derived from a practicing of my invention. Therefore, once having attached the base plate 22 to the workshop table 10, more specifically the tabletop 12 thereof, doing so with the four flathead screws 24, the saw mount 20 is in readiness for use.

It should be mentioned that the members 74, 76 having the generally U-shaped cross section as already mentioned, which are slidable within the tubular rails 64, 66 can be completely withdrawn from the tubular rails 64, 66, thereby allowing the turntable assembly 80 to be removed; this is an advantage when transporting the saw mount from one vantage point to the other. Also, removal of the turntable assembly 80 facilitates the anchoring of the base plate 22 to the tabletop 12 with the flathead screws 24.

Assuming that the tubular member 74 and 76 have been inserted into the tubular rails 64, 66 with their free edges 74a and 76a, respectively, flexed somewhat so as to bear slightly on the inner surfaces of the rails 64 and 66, this condition being pictured in FIG. 1, if a crosscut is to be made, then the pointer 47 on the vertical flange 36 of the angle member 32 is aligned or brought into registry with the appropriate gauge mark 46 so as to cause the tubular rails 64, 66 to be perpendicular. The set screw 44 under these circumstances can be threadedly engaged with the tapped hole 45a, as depicted in FIG. 3, to maintain the desired right angle relation. For completeness, a two-by-four board 130 has been shown as the work to be cut. The bushing 48 determines the elevation of the angle member 32 and hence the elevation of the rails 64, 66. Normally, no underlying spacers need be placed beneath the tubular rails 64, 66, for the brackets or brace units 50, 52 provide more than adequate rigidity for the cantilevered orientation of the tubular rails 64, 66.

Once the rails 64, 66 have been adjusted so as to effect a perpendicular crosscut, this being through the agency of the pointer 47 and the appropriate alignment thereof with the proper gauge mark 46 plus the engagement of the set screw 44 in the tapped hole 45a, then all that the user need do is to push the circular saw 112 toward the work. The tubular rails 64, 66 accurately track the turntable assembly 112 via the U-shaped tubular members 74, 76 and the flanges 78 thereon projecting through the slots 72 so that the saw effects an accurate cut in the desired direction.

If the work 130 is to be cut, say, at a 45° angle, then set set screw 44 would be loosened and the pointer 47 on the vertical flange 36 of the angle member 32 would be aligned with the appropriate gauge mark 46 on the upstanding tubular post 28. The set screw 44 would then be threaded into either the tapped hole 45b or 45c, as the case may be, to maintain this preferred angular relation. All that the user then need do is to advance the turntable assembly 80 in the same manner as he pushed it when making a perpendicular cut.

Whenever the user desires to make a ripcut, then he rotates the turntable assembly 80 so that the appropriate gauge mark 100 on the upper circular plate or disc 96 will be aligned with the pointer 102. In other words, the turntable assembly 80 would be rotated through 90° with respect to the position shown in FIG. 1.

It will be understood that the two overcenter clamps 104 simply when actuated into clamping position have foot portions 108 that bear tightly downwardly on the upper disc 96 in order to maintain it in whatever angular position into which it has been rotated. Thus, when using the turntable assembly 80 for a crosscut, the overcenter clamps 104 would be engaged with the upper disc 96 just as they are in FIG. 1. The headed pin 111 also assures that the disc 96 of the turntable assembly 80 will remain in the proper position. Once having rotated the turntable assembly 80 through 90° after loosening the clamps 104, then the clamps 104 are reengaged with the upper circular disc 96 to maintain it in its adjusted position.

Assuming that the turntable assembly 80 has been rotated through 90° from the position illustrated in FIG. 1, then one only needs to first move the turntable assembly 80 in a rectilinear direction, either toward or away from the angle member 32 to where the work 130 has been placed or he may move the work 130 to where the saw 112 is located. The clamping devices 120 are used to maintain the turntable 80 in the appropriate position. For the sake of simplicity, it will merely be assumed that the two-by-four board 130 is to be cut lengthwise. The board 130 is then moved longitudinally, that is parallel to the angle member 32, with the turntable assembly 80 remaining stationary by reason of the clamps 120 (but rotated through 90° from the position depicted in FIG. 1). Whether making a crosscut or ripcut, the clear plastic disc 94 permits the work 130 to be viewed when making a saw cut.

The operation of the embodiment illustrated in FIGS. 8-16 is, in may respects similar to that of the above illustrated embodiments. In the present embodiment, vertical column 207 rotates with turntable 205 so that the assembly upon which circular saw 112 is horizontally reciprocally journaled may be rotatably positioned to provide the appropriate angular relationship with the forward face of fence 204. Appropriately graduated scale markings (not shown) may be utilized to accomplished this function. For example, if the longitudinal axis of rails 223 and 224 were to be disposed at an angle of 45° to the front face of fence 204, horizontal reciprocation of saw 112 will result in cutting of a 45° angle across a board disposed on base 202 in front of fence 204.

The initial relationship of the elements of may saw mount is such that subframe 214 is adjacent to and in engagement with stop 221 and saw frame 230 is in engagement with the front vertical face of main frame 208.

Figure 11:
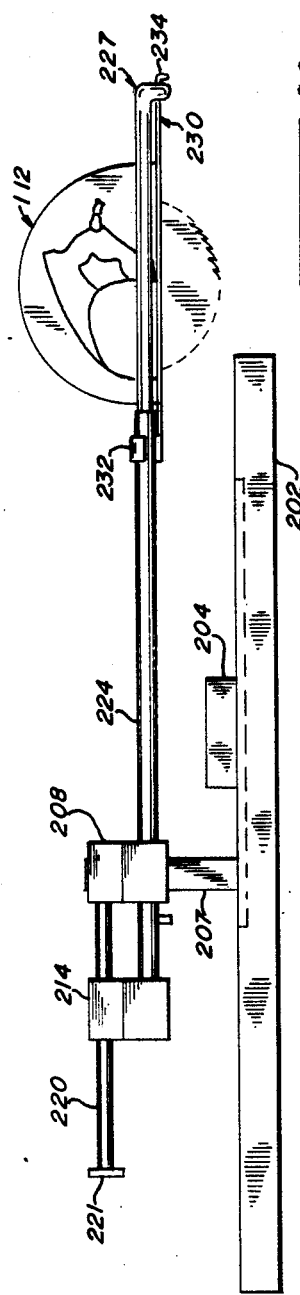
FIG. 11 is a side elevational view of the embodiment of FIG. 8 showing the respective elements of my invention in a direction position.
Figure 14:
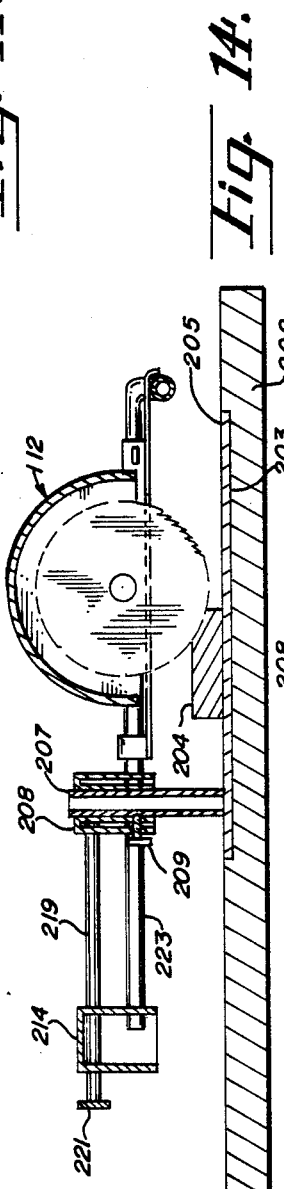
FIG. 14 is a side elevational view taken along section lines 14—14 of FIG. 9 of the drawings.
Figure 16:
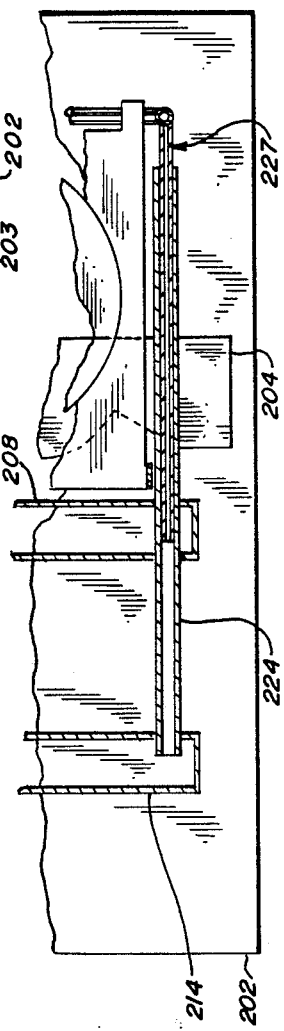
FIG. 16 is a fragmentary sectional view taken along section line 16—16 of FIG. 13 of the drawings.
Figure 13:
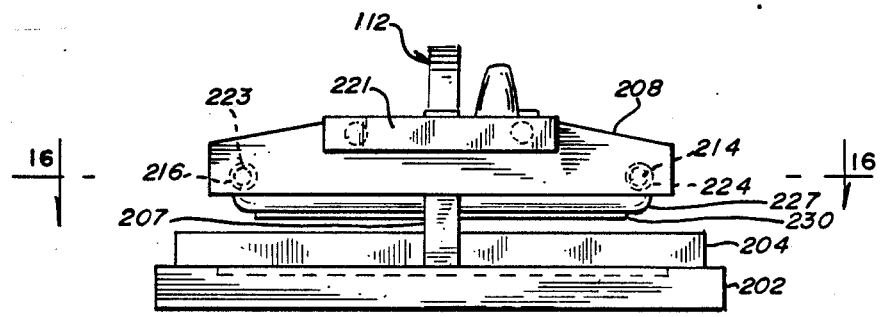
FIG. 13 is a rear elevational view of the apparatus shown in FIG. 8.
Figure 15:
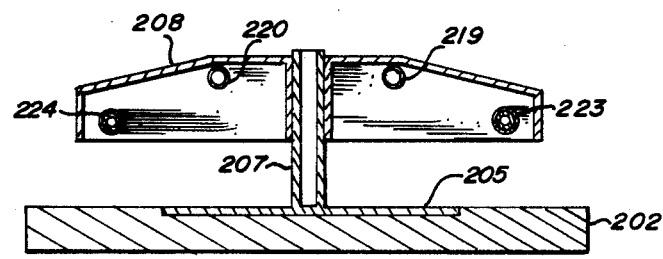
FIG. 15 is a side elevational sectional view taken along section line 15—15 on FIG. 9 of the drawings.
Figure 12:
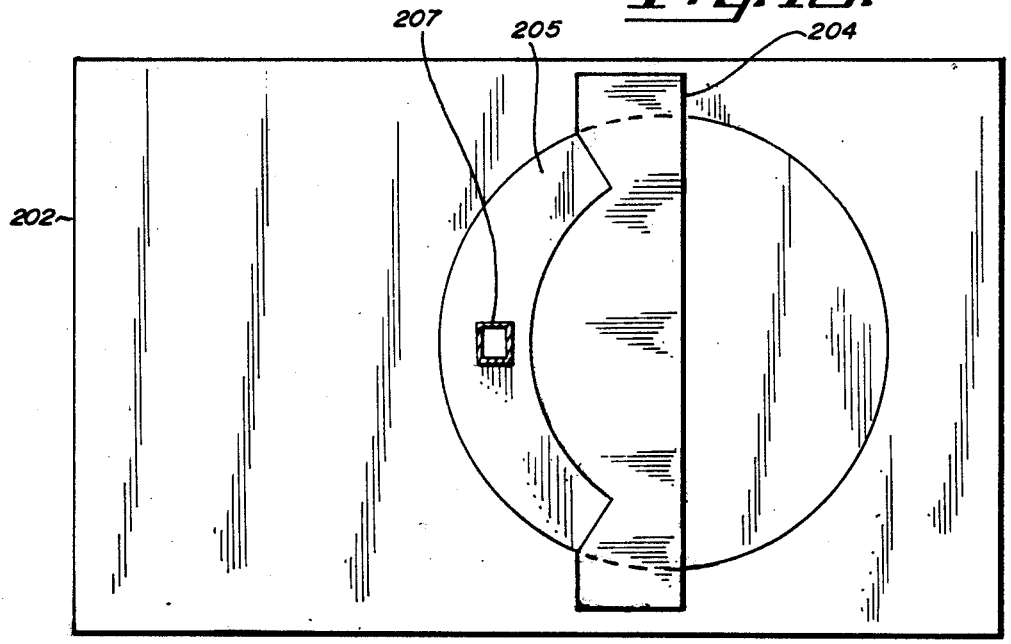
FIG. 12 is a top plan sectional view taken along section line 12—12 on FIG. 8 of the drawings.

As saw frame 230 is slidably moved to the right, as in FIG. 8, lateral support 231 and 232 will engage stop members 225 and 226 and cause subframe 214 and rails 223 and 224 to move to the right to assume a position similar to that of FIG. 11 showing the relative disposition of the elements a saw 112 is reciprocated from the initial rest position to a final position at the extreme end of a sawing stroke as required by the width of a board to be cut.

I claim:

1. A saw mount comprising;
   a support member;
   a base plate for attachment to a workshop table and a vertical post extending upwardly from said base plate;
   said support member including an angle member having a vertical flange, a horizontal flange with a collar member thereon to be movably disposed on said vertical post;
   means for holding said angle member in a spaced position from the base plate;
   a pair of parallel elongated tubular rails, each having one end attached to and extending perpendicular from the vertical flange on said support member;
   a turntable assembly for mounting a circular saw thereon; and
   elongated generally U-shaped members slidably received in said rails for constraining and carrying said turntable assembly for rectilinear parallel movement with respect to said rails in a direction toward and away from said support member.

2. A saw mount in accordance with claim 1 in which the means for spacing is a bushing means disposed on the vertical post intermediate the base plate and the horizontal flange.

3. A saw mount in accordance with claim 1 including a set screw threadedly carried by said collar for engaging said post to maintain said angle member at a desired angle with respect to said post.

4. A saw mount in accordance with claim 1 in which said tubular rail have inwardly facing horizontal slots therein and said slidably received members each having a horizontal flange secured thereto and projecting toward the other through said slots, said turntable assembly being carried by said flanges.

5. A saw mount in accordance with claim 4 in which said slidably-received members have a generally U-shaped cross section.

6. A saw mount in accordance with claim 5 in which the free edge of each slidably-received member flexes against the inside of the tubular rail in which it is slidably received.

7. A saw mount in accordance with claim 4 in which said turntable assembly includes a lower plate, a plurality of upwardly directed studs secured to said lower plate, said flanges having holes therein for the accommodation of said studs, and wing nuts on said studs for suspending said lower plate and turntable assembly from said flanges.

8. A saw mount in accordance with claim 7 in which said studs each have a vertical spacer member encircling the lower portion thereof so as to suspend said turntable assembly at a desired location with respect to said tubular rails.

9. A saw mount in accordance with claim 8 in which said lower plate has a web having a central opening, said turntable assembly further including a circular disc rotatably supported by said angular web, and a second circular disc above said first-mentioned circular disc, said last-mentioned circular disc having gauge markings thereon which cooperate with a pointer on said lower plate so that said second circular disc can be rotated into a preferred angle with respect to said lower plate.

10. A saw mount comprising, in combination;
    laterally spaced parallel tubular rail members each having an inwardly directed slot facing toward each other therein;
    an elongated complementary configured generally U-shaped member telescopically received in each of said tubular rail members;
    a flange on each of said U-shaped members, said flanges and projecting inwardly toward each other through said slots;
    a turntable assembly for mounting a saw suspended from said inwardly directed flanges; and
    a support member for attachment to a workshop table including an angle member having a horzontal flange, a vertical flange and a collar secured to said horizontal flange, means for removably connecting said collar to means on the workshop table, and means for connecting said vertical flange to corresponding ends of said tubular rail members.

11. A saw mount in accordance with claim 10 including a pair of brackets, each bracket having a vertical gusset and a horizontal gusset, portions of said tubular rails overlying said horizontal gussets so that said rails extend from said brackets in a cantilever fashion.

12. A saw mount in accordance with claim 11 in which said horizontal gussets underlie and are welded to the horizontal flange of said angle member.

13. A saw mount in accordance with claim 12 in which said vertical gussets are welded to the ends of said horizontal and vertical flanges of said angle member.

* * * * *